Oct. 7, 1924.  
W. E. SAUERMAN  
BUTTER WORKER  
Filed Nov. 13, 1923  
1,510,800
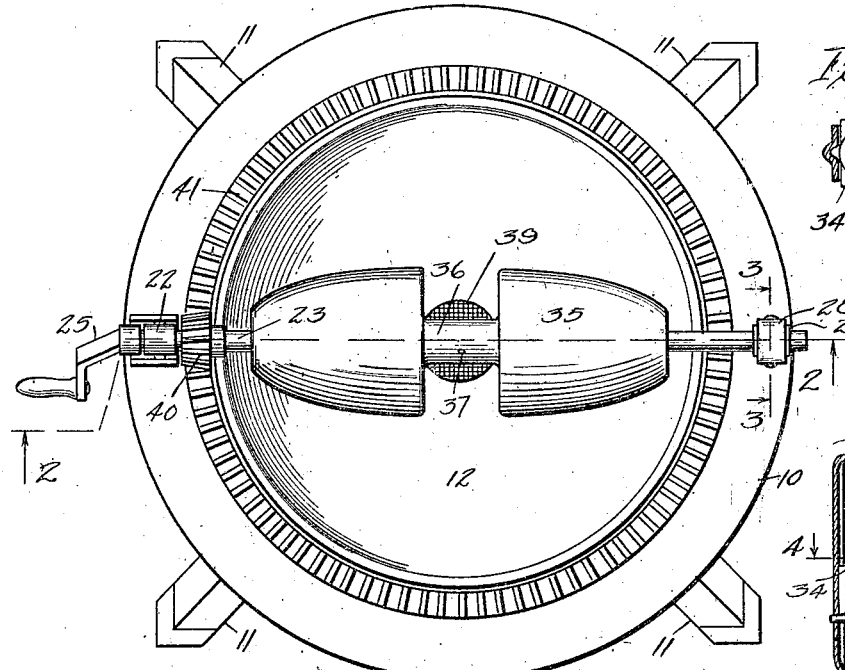
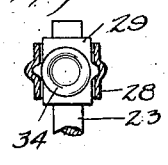
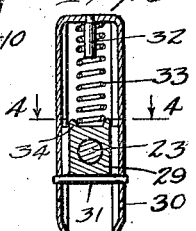
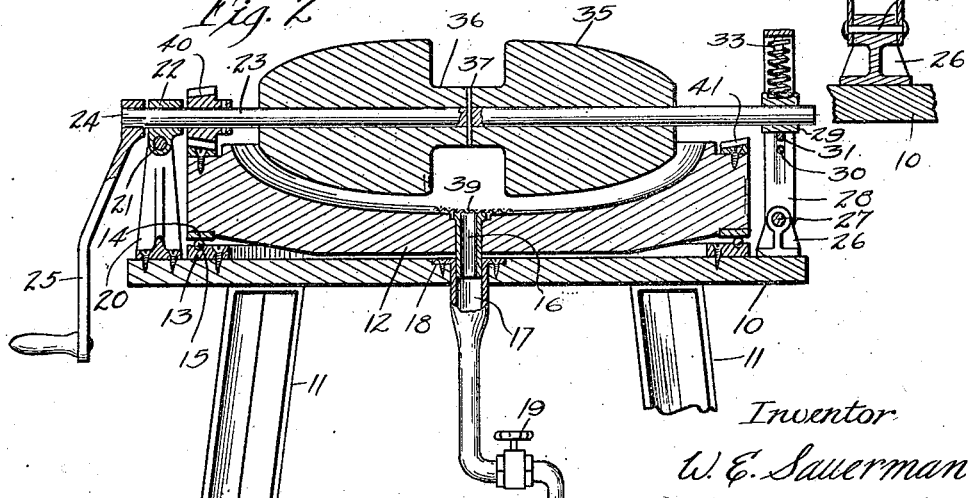
Inventor  
W. E. Sauerman  
By Bair & Freeman  
Att'ys
Witness  
Lynn Latta Patented Oct. 7, 1924.

1,510,800

UNITED STATES PATENT OFFICE.

WILLIAM E. SAUERMAN, OF AVOCA, IOWA.

BUTTER WORKER.

Application filed November 13, 1923. Serial No. 674,579.

*To all whom it may concern:*

Be it known that I, WILLIAM E. SAUERMAN, a citizen of the United States, and a resident of Avoca, in the county of Pottawattamie and State of Iowa, have invented a certain new and useful Butter Worker, of which the following is a specification.

The object of my invention is to provide a mechanical butter worker of simple, durable and inexpensive construction.

More particularly, it is my object to provide such a butter worker having a rotatably mounted bowl arranged to rotate on a vertical axis and a rotating roller or rollers arranged to rotate on a horizontal axis for working butter in the bowl.

A further object is to provide in such a structure a novel mounting, which is so constructed as to facilitate the operation of the machine and also its assembling and disassembling for purposes of repair, storage, transportation, cleaning and so on.

With these and other objects in view, my invention consists in the construction, arrangement and combination of the various parts of my butter worker, whereby the objects contemplated are attained, as hereinafter more fully set forth, pointed out in my claims, and illustrated in the accompanying drawings, in which:

Figure 1 shows a top or plan view of my improved butter worker.

Figure 2 is a vertical, transverse, sectional view taken on the line 2—2 of Figure 1.

Figure 3 is a vertical, sectional view taken on the line 3—3 of Figure 1; and

Figure 4 is a horizontal, sectional view taken on the line 4—4 of Figure 3.

In the accompanying drawings, which illustrate a form in which my invention may be embodied, I have used the reference numeral 10 to indicate generally a platform or base supported on legs 11. Resting above the base 10 is a bowl 12, which is preferably circular in outline.

On the base or platform 10 beneath the outer portion of the bowl 12 is an annular ball race 13. On the under surface of the bowl 12 at its outer edge is a coacting ball race or annular plate 14. Balls 15 are received in the ball race 13 for reducing friction during the rotation of the bowl 12.

Mounted in the central portion of the bowl 12 is a tubular member 16 extending through the bottom of the bowl, as shown in Figure 2, and projecting below the bowl.

Extending through the base 10 and supported thereon is a drain pipe or the like, having at its upper end a flange 18 countersunk in the upper surface of the platform 10. The lower projecting end of the tube 16 is received in the upper end of the drain pipe 17, thus serving to journal the bowl on the platform 10. The drain pipe 17 may be provided with a control cock 19.

On the platform 10 at one side thereof is mounted an upright bracket 20. Pivoted to the bracket 20 at its upper end at 21 is a journal 22 of substantial length for a shaft 23. The outer end of the shaft 23 is squared at 24 to receive the crank handle 25.

The pivot 21 is arranged horizontally and at right angles to the shaft 23, as shown in Figure 2.

On the platform 10 at the opposite side thereof from the bracket 20 is a short bracket 26. Pivoted to the bracket 26 by means of the pivot pin 27 is a normally upright hollow casing 28, in which is supported the opposite end of the shaft 23. The casing 28 is open on its opposite sides, to wit, on the side adjacent to the bowl 12 and the opposite side.

Mounted in the casing 28 for vertical sliding movement is a journal block 29, which rotatably receives the shaft 23. The walls of the casing 28 are provided with a series of holes 30 to selectively receive a pin 31, which limits the downward movement of the journal block 29. The pin 31 may be mounted at different heights in different pairs of holes 30 for determining the limit of such downward movement.

In the top of the casing 28 is a downwardly projecting pin 32. A coil spring 33 is received in the upper part of the casing 28 between the top thereof and the journal block 29. The pin 32 projects into the coil spring 33, as shown in Figure 3. The top of the journal block 29 is provided with an annular rib 34 within which is seated the spring 33.

A double-ended roller 35, having a reduced central portion 36 is mounted on the shaft 23 within and above the bowl 12, as illustrated, and is locked to the shaft 23 by means of a pin 37. (See Figure 2.)

Fastened to the upper end of the tube 16 is a screen or the like 39. Fixed on the shaft 23 adjacent to the journal 22 is a beveled pinion 40, which meshes with an annular beveled rack 41 on the upper surface of the bowl 12 at the outer edge thereof.

It will be seen that when the machine is assembled, the parts will be in their relative positions shown in the drawings, and that when butter is placed in the bowl 12, and the crank handle 25 is manipulated, the shaft 23 will thereby be rotated. The rotation of the shaft 23 is imparted to the roller 35 and through the rack 41 to the bowl 12.

When the handle is rotated, the bowl 12, as shown in Figure 1, will be rotated clockwise, and the left-hand end of the roller 35 will rotate in a sense with the bowl, while the right-hand end of the roller will rotate in a sense in the opposite direction.

This will cause the butter in the bowl to be thoroughly worked.

The interior of the bowl is concave in shape.

The water and liquid worked out of the butter will flow through the screen 39 and the tube 16 into the drain pipe 17.

During the operation of the device, the shaft 23 will not move to the left because the fixed pinion 40 thereon will engage the journal 22. It will not move substantially to the right because the rack 41 is inset slightly in the upper surface of the bowl 12 and any such movement to the right is limited by the engagement of the pinion 40 with the bowl 12.

When it is desired to remove the roller 35 and shaft 23 for washing or otherwise, the crank 25 is removed from the shaft. The right-hand end of the shaft is then lifted, compressing the spring 33 and sliding the journal block 29 upwardly with a slight sliding movement of the shaft in said journal block. The shaft is tilted enough to permit the pinion 40 to clear the bowl 12 and to permit the roller 35 to clear the block, and is then slid to the right until its left-hand end is slid out of the pivoted journal 22. The left-hand end of the shaft is then raised and the whole shaft and the roller 35 are slid to the left for sliding the shaft out of the journal block 29. The last tilting movement is permitted by the pivot pin 27.

It will be seen that by reversing the series of operations just described, the machine can be reassembled.

My butter worker is of simple construction, will not readily get out of order, can be easily taken apart for cleaning, repair, storage or transportation. After the shaft has been removed from its journal, the bowl 12 can be lifted up and scalded and washed.

It will, of course, be understood that the construction and arrangement of the parts may be varied within the spirit of my invention, and that refinements in the details of the construction are contemplated, and it is my intention to cover by my claims, any modified forms of structure or the use of mechanical equivalents, which may be reasonably included within their scope.

I claim as my invention:

1. In a butter worker, a platform, a rotatably mounted bowl thereon, brackets on said platform, a pivoted journal bearing on one of said brackets, a journal box supporting member pivoted on the other of said brackets, a journal box slidably mounted on said supporting member, a shaft slidably and rotatably mounted in said journal and bearings, a gearing element fixed on said shaft, a coacting gearing element on said bowl, and a roller on said shaft.

2. In a butter worker, a bowl, a shaft, a roller on said shaft, a pivoted journal bearing for one end of said shaft, and a journal bearing for the other end of said shaft having a pivotal and sliding movement.

3. In a butter worker, a bowl, a shaft, a roller on said shaft, a pivoted journal bearing for one end of said shaft, and a journal bearing for the other end of said shaft having a pivotal and sliding movement, said bowl being rotatably mounted, and gearing connections between the bowl and the shaft.

Des Moines, Iowa, November 2, 1923.

WILLIAM E. SAUERMAN.